INVENTOR.
Franz Wilhelm Reinhard Starp

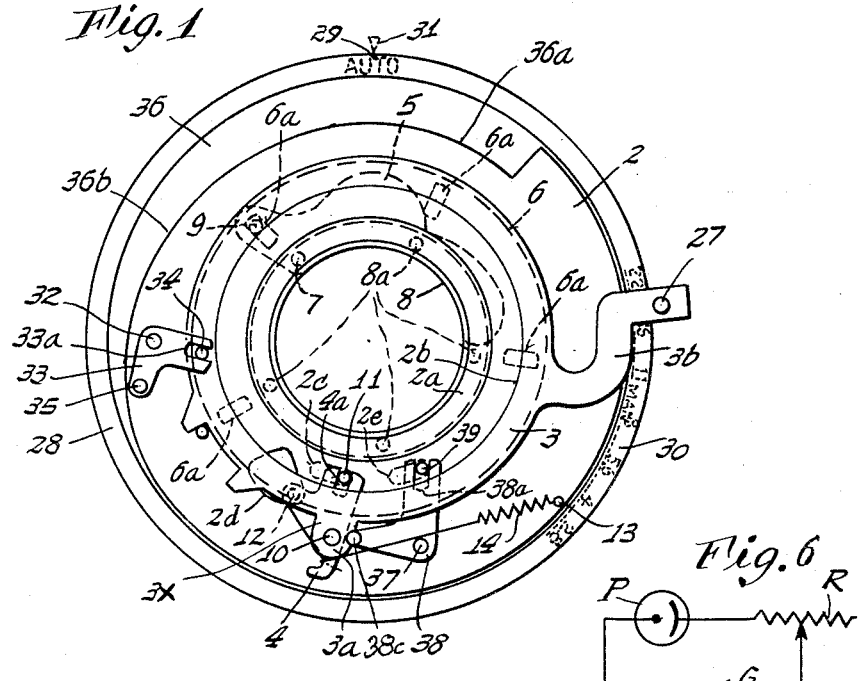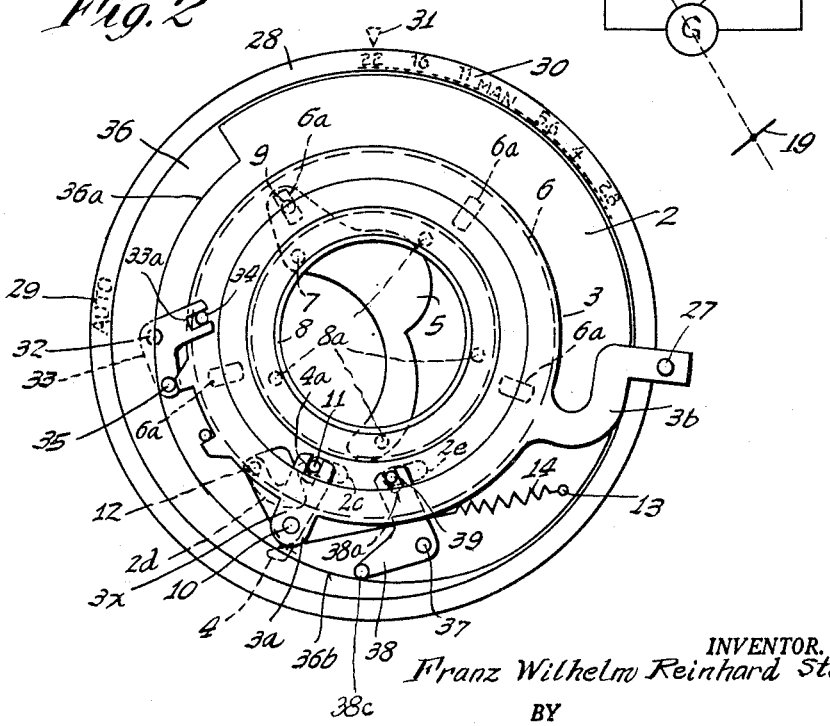

BY March, Gillette, Virgil & Eslinger
ATTORNEYS

United States Patent Office 3,136,235
Patented June 9, 1964

3,136,235
PHOTOGRAPHIC CAMERA CONTROL WITH
MANUAL AND AUTOMATIC SELECTION
Franz Wilhelm R. Starp, Calmbach (Enz), Germany,
assignor to Alfred Gauthier, G.m.b.H., Calmbach
(Enz), Germany, a corporation of Germany
Filed Nov. 2, 1960, Ser. No. 66,841
Claims priority, application Germany Nov. 7, 1959
14 Claims. (Cl. 95—64)

This invention relates to photographic cameras of the type wherein an adjustable diaphragm is disposed in the lens assemblage.

An object of the invention is to provide a novel and improved diaphragm control or adjusting mechanism in a camera of this type, by which a small adjusting movement of the diaphragm is obtained while at the same time there is had a simple and economical structure, and wherein further the adjusting characteristic of the diaphragm can be adapted readily to the particular requirements of a camera in a simple manner.

This is accomplished, in accordance with the invention, by a novel organization comprising a transmission member which is movably carried by the diaphragm setting member, such transmission member for example comprising a lever connected on the one hand to the diaphragm operating member which actuates the lamellas or segments of the diaphragm and on the other hand with a fixed curved guide or cam.

A diaphragm adjusting device as provided by the invention thus comprises a small number of structural members or components which are of simple configuration and which may be economically fabricated. In addition, it has the advantage that the adjusting movement of the diaphragm setting member, which is necessary to shift the diaphragm from one extreme position to the other, may be made very small. With the present improved construction the adjusting movements of the setting member and of the diaphragm operating member (which latter adjusts or actuates the diaphragm segments) are approximately of the same size, as made possible by the above mentioned transmission lever.

Moreover, by virtue of the cooperation between the transmission lever which is carried by the diaphragm setting member and the fixed, curved guide or cam it is possible to obtain a control over the movements of the diaphragm operating member to provide the desired or necessary adjusting characteristic of the diaphragm in a simple and economical manner.

For the purpose of automatically setting the diaphragm, as provided by a further construction in accordance with the invention, the setting member which has the small extent of adjusting movement is arranged to be automatically actuated under the control of a known type of light intensity measuring device of an exposure meter.

The use of a diaphragm control and setting mechanism as thus provided by the invention results in special advantages since the adjusting characteristic of the diaphragm can be adapted in a simple manner to the particular characteristic of the light intensity measuring device by appropriate shaping of the curved guide or cam which cooperates with the transmission member. This makes it possible to use light intensity measuring devices of any characteristic whatsoever. Further, the small adjusting movements which characterize the diaphragm setting member make it possible to establish a simplified connection between such setting member and the light intensity measuring device which eliminates more complicated and costly transmissions. This is of special importance where the diaphragm operating member is connected in a well-known manner to the light intensity measuring device to effect its actuation by means of a sensing member of the measuring device, whereby the operating member has a path of movement which is dependent upon the prevailing light intensity, such movement being in response to operation of the camera or shutter release. Since, on the one hand, the extent of movement of the camera release is determined by the maximum path of movement of the diaphragm setting member and on the other hand since it is desired to have as short a release path as possible in the interest of an easy and dependable manner of operating the camera, the characteristic by which there is had a small adjusting movement of the diaphragm setting member is of particular importance.

In order to adapt the camera to an additional field of use when there is employed the diaphragm adjusting mechanism as provided by the invention, having in mind especially the effecting of flash exposures, there is provided a manually operable switch or selector member which may be positioned in either "automatic" or else "non-automatic" or manual positions and by means of which the diaphragm can be made responsive to either automatic or manual setting means, being connectable for the latter purpose to a manually operable setting member.

Such conditioning or switching of the diaphragm may be effected in a simple and dependable manner and without requiring any intervention in the structure of the diaphragm mechanism, by arranging the diaphragm setting member which cooperates with the light intensity measuring device so that it is automatically shifted to a starting position and retained in such position in response to setting of the selector member in its "non-automatic" position.

A connection between the selector and diaphragm setting members which is of advantage as regards a flexible arrangement of the selector is obtained by arranging a lever so as to be pivotal about a fixed point, such lever being operatively and drivingly connected to the diaphragm setting member and being pivotally movable in response to shifting of the selector member to its "non-automatic" or manual position. The lever in so moving shifts the diaphragm setting member to and retains it in a starting position, wherein it does not interfere with manual adjustment of the diaphragm. The pivoting movement of the lever may be effected by a control member or cam which is provided on the selector member.

The selector member itself may be used for the purpose of effecting manual adjustment of the diaphragm, and to this end there is provided a diaphragm scale and a setting or index mark cooperating therewith, these being associated with the selector member to provide indications of the diaphragm aperture. The scale may be provided on the selector member and the setting mark may be located on a fixed part of the camera, or these two cooperable components may be reversely located, as will be readily understood.

The utilization of the selector member as both the switching means for the diaphragm and the manually operable adjustment means for the diaphragm has the advantage of eliminating components and simplifying the structure of the camera, thereby effecting a desirable economy in manufacture.

For the purpose of connecting the selector member to the diaphragm to actuate the latter, there is provided by the invention a second lever movable about a fixed point, which lever is drivingly connected to the diaphragm operating member and is influenced or actuated in response to shifting of the selector member to its "non-automatic" or manual position by a control means, as for example a cam. The said control means or cam is connected in any suitable manner to the selector member and serves advantageously to effect the diaphragm adjustment, making possible a long or expanded scale.

This provides a flexible organization and structure, as well as one which enables the method of setting the diaphragm to be easily understood, especially since as above mentioned the diaphragm setting scale may be widely extended or expanded.

The present organization has a further advantage, as regards a simple construction of the selector mechanism when the same is used for switching and adjusting the diaphragm in that the fixed cam for the transmission member carried by the diaphragm setting member may be constituted as a uni-lateral guide arranged to have abutting engagement with the transmission member under the action of a spring influencing the latter. A uni-directional drive is thus established which provides freedom to the blade operating member from the retained setting member, for the manual adjustment operation.

In those cameras wherein, for the purpose of automatically setting the diaphragm in response to indications or readings of a light intensity measuring device a sensing member is connected to the diaphragm setting member in a known manner and is influenced by a spring which tends to shift it toward a position corresponding to either the largest or else the smallest diaphragm aperture, such sensing member being rendered operative in response to actuation of the camera or shutter release for the purpose of sensing the position of the movable member of the measuring device, a simple and economical organization involving few components is obtained by utilizing a single spring for biasing both the diaphragm operating member and also the sensing member. Such spring advantageously may be the spring directly associated with the transmission member.

The invention is explained further in the accompanying drawings, showing one embodiment of the invention wherein:

FIG. 1 is a rear elevational view of the interior of a photographic intra-lens shutter assemblage disposed within a circular housing. Arranged in the said housing are the diaphragm segments or lamellas together with a diaphragm switching or selector device as provided by the invention. The selector device is shown in its "automatic" position and the diaphragm is set at the largest opening or aperture.

FIG. 2 is a view similar to that of FIG. 1, but showing the selector member in its "non-automatic" or manual position.

FIG. 6 is a schematic circuit diagram showing another portion of the automatic light-responsive setting mechanism for the diaphragm.

Figure 5:
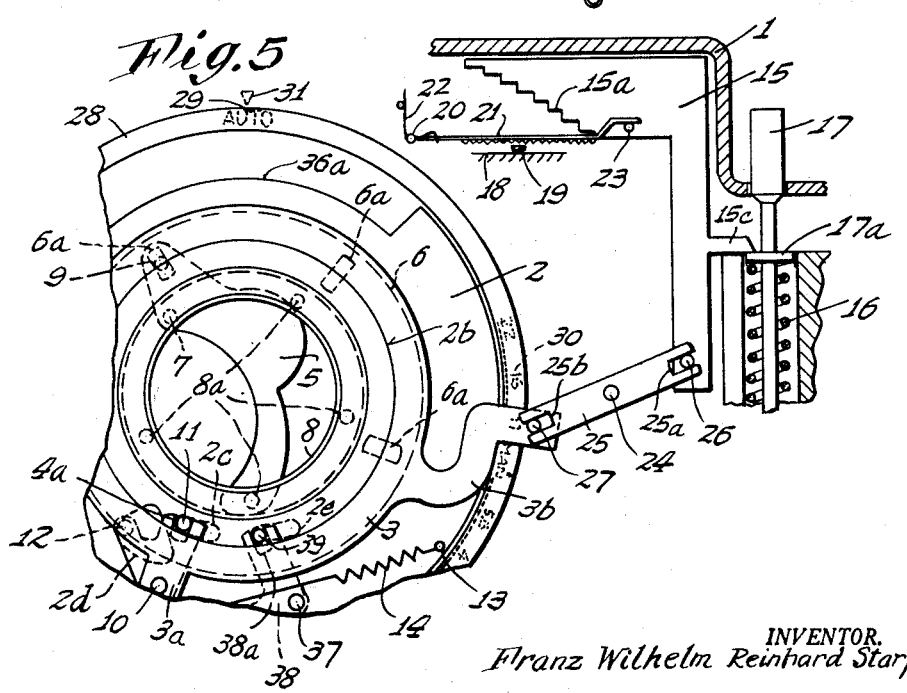
FIG. 5 is a fragmentary rear elevational view of the interior of an intra-lens shutter assemblage together with a fragmentary representation of the camera release and associated automatic setting mechanism, the latter being coupled with the diaphragm setting member of the shutter assemblage.

Referring first to FIG. 5, the housing or casing of the photographic camera is indicated by the numeral 1. Affixed to the front side of the housing 1 in a well-known manner is a photographic intra-lens shutter assemblage having a shutter housing 2. Disposed within the latter is an adjustable segment-type diaphragm which will be described below, which is cooperatively associated with the lens assemblage of the camera (not shown for reasons of clarity of illustration). The lens carrier of the lens assembly may be a well-known tubular socket (not shown) provided on the front of the shutter housing 2, and a second tubular socket of similar construction, having the numeral 2a, may be provided on the rear wall of the shutter housing.

In accordance with the invention there is provided a novel organization in conjunction with a diaphragm setting ring 3, such organization being characterized by a transmission member or lever 4 which is movably carried by the setting ring. The lever 4 is drivingly connected on the one hand with a diaphragm operating ring 6 which is arranged to actuate the diaphragm lamellas or segments 5, said lever on the other hand being connected with a fixed, curved guide or cam 2d. The diaphragm setting ring 3 has a bearing on the rear of the shutter housing at a bearing shoulder 2b, whereas the diaphragm operating ring 6 is positioned on the inside of the rear wall of the shutter housing. The ring 6 is held against axial movement, together with the diaphragm segments 5, by a bearing plate 8 which is fixedly screwed to the inside of the rear wall of the shutter housing. A small portion of the bearing plate 8 is visible at the interior of the tubular socket 2a, as may be seen in FIGS. 1, 2 and 5. The diaphragm segments 5, which are of sector-like shape, having bearing pins 7 which are received in openings 8a of the bearing plate 8. In addition, the segments have pin-and-slot connections 6a, 9 with the rotatable operating ring 6. The transmission lever 4 is carried by an axis or pivot pin 10 which is disposed in an eye or apertured lug 3a of the setting ring 3. The transmission lever 4, which has a shape readily apparent from the figures, has a pin-and-slot connection 4a, 11 with the operating ring 6, there being a clearance slot 2c provided in the housing 2 for thet pin 11 which is actuated by the lever and is disposed in the slot 4a thereof. In addition, for the purpose of obtaining the desired adjusting characteristic of the diaphragm, the transmission lever 4 has a cam follower portion comprising a pin 12 which is engageable with a curved guide or cam provided on the rear wall of the shutter housing 2. In the illustrated embodiment of the invention, the cam or curved guide comprises a control edge 2d. The pin 12 engages the said control edge 2d under the action of a spring 14 which is connected with the transmission lever 4 and with a fixed pin 13. For the purpose of automatically setting the diaphragm, a light intensity measuring device of a known kind per se is provided, such measuring device having a pointer or movable member 19 as shown in FIG. 6, which is cooperable with an automatic setting mechanism connected with the diaphragm setting ring 3.

The light intensity measuring device may, for example, be a well-known type of galvanometer G which is energized by a photo-electric cell P, there being a calibrating resistor R disposed in the energizing circuit, all as shown in FIG. 6.

Referring to FIG. 5, the needle or pointer 19 of the measuring device G is cooperable and engageable with a vertically movable sensing member 15 by means of which it is possible to sense in a well-known manner per se to be described below, the position of the movable member or pointer 19. The measuring device G constitutes part of an exposure meter which also comprises the photo-electric cell P as well as the calibrating resistor R, these being usually incorporated in the camera. The sensing of the movable member 19 by the sensing member 15 is effected in response to actuation of the camera or shutter release 17, which is movable against the action of a compression coil spring 16. The sensing member 15 is tensioned or biased by the above mentioned spring 14 provided for the transmission lever 4, since the spring 14 by its connection to the lever imparts a counterclockwise bias to the diaphragm setting member 3 which is drivingly connected to the sensing member 15 in a manner described below. At this point it may be mentioned that the influence of the spring 14 on the sensing member 15 biases the latter downward and maintains a lug 15c thereof in engagement with a collar or flange 17a provided on the camera release 17. The spring 14 is lighter than and is overcome by the spring 16 which acts directly on the release plunger 17, whereby the sensing member 15 normally occupies the position shown in FIG. 5 when the camera release 17 is not being depressed. To effect cooperation with the movable member 19 of the measuring device G (such member being, for example, carried by the moving coil of the measuring device), the sensing member 15 has a stepped setting edge 15a arranged to engage the member 19 in response to operation of the release plunger 17 in a downward direction. Such engagement is dependent upon the action of the spring 14, as will be understood. The needle or movable member 19 is shiftable over a clamping surface or stop 18, and may be clamped thereto in any adjusted position in a well-known manner, by means of a clamping lever or arm. As seen in FIG. 5, the clamping arm is designated 21, such arm being pivotally carried by a pivot pin 20 and being normally held out of engagement with the pointer 19 by an abutment pin 23 affixed to the sensing member 15. The clamping arm 21 is biased in a clockwise direction by a spring 22. With the parts in the positions shown in FIG. 5 the pointer or movable member 19 is free and may be adjustably shifted in response to existing light conditions. However, when the sensing operation is initiated by depressing the camera release plunger 17, the clamping arm 21 immediately swings downward and clamps the pointer 19 against the surface or member 18. As shown, the underside of the clamping arm 21 has a ribbed or roughened surface so as to more securely hold and clamp the needle in its adjusted position.

The position of the needle 19 and hence the extent of movement which the sensing member 15 may have during the process of automatically setting the diaphragm depends upon the light intensity which prevails during an exposure, as well as upon the setting of other exposure influencing factors differing from the diaphragm setting, such as the factors of shutter speed, film sensitivity and filter. These factors can be taken into consideration during the setting of the movable member or pointer 19 in any known manner, as for example by rotatably shifting the entire measuring device or galvanometer G.

For the purpose of connecting the sensing member 15 to the diaphragm setting ring 3 there is provided as shown in the illustrated embodiment of the invention a two-armed lever 25 which is pivotally mounted about a stationary pivot pin 24 affixed to the camera housing or casing. The lever 25 has pin-and-slot connections 25a, 26 and 25b, 27 respectively with the sensing member 15 and with an arm or lug 3b provided on the diaphragm setting ring 3, said arm projecting beyond the outer periphery of the shutter housing 2.

For the purpose of obtaining, in the above described connection between the sensing member 15 and the diaphragm setting ring 3, a slight amount of lost motion during which the clamping arm 21 clamps the needle 19, the diaphragm is arranged to be closed, for the starting position of the sensing member, to an extent slightly more than the smallest diaphragm value desired and provided for it, said value being for example the aperture value 22. In this manner the diaphragm has a preliminary movement within which, upon actuation of the camera release plunger 17, the clamping of the needle 19 is effected by means of the lever 21. Upon further depressing movement of the camera release 17 the setting ring 3 and the sensing member 15 are jointly adjusted by the spring 14 to such an extent that one of the steps or notches of the edge 15a of the sensing member becomes engaged with the needle 19 of the measuring device of the exposure meter. The rotatable adjustment of the diaphragm setting ring 3 under the action of the spring 14 takes place in a counterclockwise direction, whereby there is effected an adjustment or turning of the operating ring 6 in the direction of the largest diaphragm aperture, this being effected by means of the transmission lever 4 which is maintained in engagement with the control or cam edge 2d by the spring 14.

As is further apparent from the figures, only a small extent of movement of the diaphragm setting ring 3 is required in order to adjust the diaphragm in accordance with the organization provided by the invention. Accordingly, the connection between the diaphragm setting ring 3 and the sensing member 15 can be effected without interposing additional transmission devices or components. Further, the cooperation of the transmission lever 4 with the compensating cam or such as the cam 2d makes it possible to obtain any desired adjusting characteristic for the diaphragm in a simple manner. This, in connection with the small adjusting movement of the setting ring 3 and the simple structure of the overall diaphragm mechanism, produces optimal conditions in every respect.

In a camera of the above described kind it is of advantage, in order to obtain a versatile applicability, to enable the setting of the diaphragm to be effected not only by the automatic means described above, but also by manual means.

Accordingly, a further construction as provided by the invention accomplishes this, utilizing a manually operable selector or switching means which can be set in either "automatic" or else "non-automatic" positions and by means of which the diaphragm can be switched so as to respond to either an automatic setting mechanism or else a manual setting mechanism; for this latter the diaphragm can be connected to a manually operable setting member.

This method makes it possible to carry out or effect those exposures in which the light conditions are different prior to and during the exposure, as for example in the case of flash exposures.

The selector member and the manually operable setting member provided for the diaphragm, in the illustrated embodiment of the invention, are one and the same rotatable ring 28 which is concentric with the optical axis and which is guided on the shutter housing in a suitable manner (not shown in the drawings). For the purpose of obtaining readings, the selector member 28 carries a setting mark 29 in the form of the word "auto," and also has a diaphragm scale 30 which is associated with the word or symbol "man" (manual). The mark 29 and the scale 30 are settable with respect to a fixed index mark 31.

Figure 3:
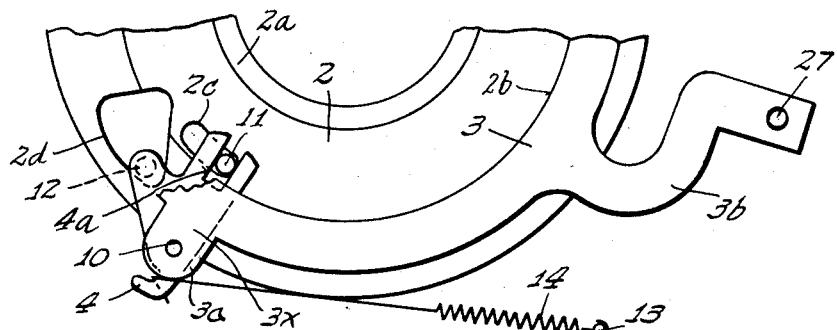
FIG. 3 is a fragmentary view, enlarged, of the members of the diaphragm setting mechanism as provided by the invention and illustrated in FIGS. 1 and 2, such members having the positions associated with the largest diaphragm aperture.
Figure 4:
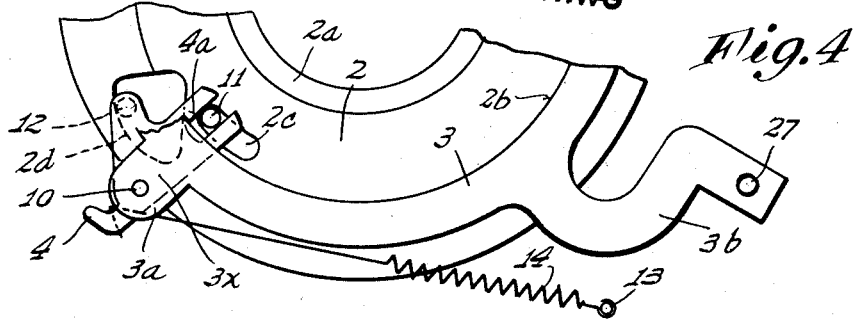
FIG. 4 is a view similar to that of FIG. 3, but showing the members of the diaphragm setting mechanism in the positions associated with the smallest diaphragm aperture.

The automatic setting mechanism for the diaphragm is disconnected or rendered inoperative upon the selector member 28 being set in the position associated with the symbol "man," in the illustrated embodiment of the invention, in a simple and desirous manner by merely retaining the diaphragm setting ring 3 in its starting position as shown in FIGS. 2, 4 and 5. For this purpose there is provided a lever 33 which is pivotally mounted about a pin 32 provided on the rear wall of the shutter housing. The lever 33 has a pin-and-slot connection 33a, 34 with the diaphragm setting ring 3 and further cooperates with a cam 36 carried by the selector member 28. For this latter purpose the lever 33 has a cam follower pin 35 affixed to it, as shown in FIGS. 1 and 2. The operation of the lever 33 is such that, upon the selector member 28 being set in the position coordinated with the symbol "man," a concentric portion of the cam 36, labelled 36a, having a length which corresponds to the size of the manually setting range of the selector member 28, is brought into engagement with the pin 35. When this occurs, upon the camera release 17 being actuated or depressed, the diaphragm setting ring 3 as well as the sensing member 15 will be retained in their starting position shown in FIG. 5.

For the purpose of operating or adjusting the diaphragm manually, the cam 36 which is connected to the selector member 28 has an ascending portion 36b which is arranged to effect operation or actuation of the diaphragm operating ring 6. In accomplishing this, a knee lever or bellcrank 38 is provided, pivotally movable about a fixed axis 37 carried by the rear wall of the shutter housing 2, the lever 38 having a pin-and-slot connection 38a, 39 with the diaphragm operating ring 6 and also having a cam follower portion comprising a pin 38c which is engageable with the cam 36b when the selector member 28 is disposed in the "man" position as shown in FIG. 2. A clearance slot 2c is provided in the rear wall of the shutter housing for the pin 39, as seen in FIGS. 1, 2 and 5. The use of the cam 36 which is connected to the selector member 28 for the purpose of adjusting the diaphragm when utilizing a manual setting makes it possible in a simple manner and without additional cost to keep the adjusting movement of the selector member 28 appreciably larger than the adjusting movement of the diaphragm actuating operating ring 6. This has an advantage in that the diaphragm scale 30 on the selector member 28 may be appreciably expanded or made to extend through a relatively large arc, thereby to render the indicia easily visible and relatively understandable, and to insure an accurate setting of the diaphragm.

The action and mode of operation of the above described camera is as follows:

(a) Effecting an Exposure Utilizing the Automatic Exposure Setting

For this purpose the selector member 28 is positioned in the "auto" setting as shown in FIGURES 1 and 5, wherein the setting mark 29 carried by the member and identified by the word "auto" is opposite the fixed index mark 31. The camera release 17 is now depressed. The sensing member 15 and the diaphragm setting member 3 connected thereto follow such motion under the action of the spring 14, resulting in the measuring mechanism needle 19 being first clamped by means of the clamping arm 21. The adjusting movement of the setting member 3 is transmitted to the diaphragm operating ring 6 by means of the transmission lever 4 which is carried by the setting member 3, thereby to effect an adjustment of the diaphragm from the position shown in FIG. 5 in the direction of the largest aperture. At the same time, the cam edge 2d imparts to the transmission lever 4 a pivoting movement which is required for obtaining the prescribed adjusting characteristic of the diaphragm. The automatic setting of the diaphragm is terminated when one of the steps or notches 15a of the sensing member 15 strikes the measuring mechanism needle 19. Upon further depressing movement of the camera release 17 the shutter is released and an exposure is effected.

(b) Effecting an Exposure Utilizing a Manual Exposure Setting

This is done by positioning the selector member 28 at the desired diaphragm value, utilizing the diaphragm scale 30 and the index mark 31. For such setting, the cam 36a of the selector member 28 engages and positions the cam follower pin 35 of the lever 33 which is connected to the diaphragm setting ring 3, thereby to retain the setting ring 3 in its starting position corresponding to the smallest diaphragm aperture independently of any movement which is imparted to the camera release 17. In addition, upon such adjustment of the selector member 28, the cam 36b engages and shifts the lever 38 in a clockwise direction, whereby the diaphragm is set at the value indicated on the scale 30. The pivoting movement of the lever 38 takes place against the action of the spring 14 which is acting on the transmission lever 4. The lever 4, which is connected to the lever 38 by means of the diaphragm operating ring 6, is able to follow the movement of the ring 6 since a free or clearance space is provided laterally of the control edge or cam 2d cooperating with the cam follower pin 12 of the lever 4.

The foregoing describes the invention with reference to a photographic camera provided with an automatic exposure setting mechanism. In this case, the use of the diaphragm arrangement as provided by the invention produces the advantage that, owing to the small adjusting movement required for the diaphragm setting ring, the automatic setting of the diaphragm can be carried out quickly and by utilizing a small extent of movement of the camera release. Owing to the small adjusting movement and the short adjusting time which characterizes the diaphragm setting member, a diaphragm device constructed in accordance with the invention is of importance in cameras of every kind, where it is essential to have a small adjusting movement of the diaphragm setting member. A small adjusting movement may be especially desirable when the setting time is to be as short as possible or when the adjusting power is to be as small as possible. Thus, the invention is of advantage especially in all those cameras wherein the diaphragm setting takes place by a motive or power means, as for example by the use of a spring.

I claim:

1. In a photographic camera of the type having an adjustable diaphragm in the lens assembly, in combination, an adjustable setting ring member for the diaphragm; a transmission member movably carried by the setting ring member; a diaphragm operating ring member; said setting ring member and diaphragm operating ring member being concentrically disposed and movable relative to each other; a driving connection between said transmission and operating ring members; and a stationary cam engaged by said transmission member for controlling the movement thereof and in consequence the movement of the diaphragm operating ring member as said setting ring member is adjusted, a light intensity measuring device and control means controlled thereby for effecting automatic adjustment of the diaphragm setting ring member; a manually operable selector member settable in "manual" and "automatic" positions, and actuatable means controlled by the selector member for rendering inoperative the said control means when the selector member is in its "manual" position, in which the setting ring member has a starting end position from which it shifts when automatically operated, and in which the actuatable means is operable to shift the setting ring member to and retain it in the said starting position when the selector member is shifted to the "manual" position.

2. In a photographic camera of the type having an adjustable diaphragm in the lens assembly, in combination, an adjustable setting ring member for the diaphragm; a transmission member movably carried by the setting ring member; a diaphragm operating ring member; said setting ring member and diaphragm operating ring member being concentrically disposed and movable relative to each other; a driving connection between said transmission and operating ring members, and a stationary cam engaged by said transmission member for controlling the movement thereof and in consequence the movement of the diaphragm operating ring member as said setting ring member is adjusted, a light intensity measuring device and control means controlled thereby for effecting automatic adjustment of the diaphragm setting ring member; a manually operable selector member settable in "manual" and "automatic" positions, and actuatable means controlled by the selector member for rendering inoperative the said control means when the selector member is in its "manual" position including an adjustment means responsive to movement of the selector member when the latter is in "manual" position, for effecting adjustment of the diaphragm operating ring member, and in which there are diaphragm scale means connected with the selector member, for indicating diaphragm values.

3. A camera as in claim 1, in which the actuatable means comprises a lever connected with the setting member, pivotally movable about a fixed point and having a cam follower portion, and comprises a cam connected to the selector member and engageable with the said cam follower portion.

4. A camera as in claim 2, in which the adjustment means comprises a lever positively drivingly connected with the diaphragm operating member, pivotally movable about a fixed point and having a cam follower portion, and comprises a cam connected with the selector member and engaged with said cam follower portion when the selector member is in its "manual" position.

5. A camera as in claim 2, in which the stationary cam comprises a uni-lateral guide having abutting engagement with the said transmission member.

6. A camera as in claim 5, in which said control means comprises a sensing member cooperatively associated with the setting ring member and a cooperable deflection member of the measuring device, in which there are means responsive to actuation of the camera release for effecting cooperation of said sensing and deflection members, and in which there is a spring acting on the transmission member, holding the latter engaged with the stationary cam and tending to shift the setting and sensing members to positions corresponding to one limit of adjustment of the diaphragm.

7. In a photographic camera of the type having an adjustable diaphragm in the lens assembly, in combination; a shutter housing, a diaphragm setting member and a diaphragm operating member mounted within said housing; said members being concentrically disposed rings movably mounted relative to each other, a transmission means interconnecting said rings, said transmission means including a transmission lever having a cam follower, said lever being pivotally connected at one end to said setting ring, a pin and slot connecting the other end of said transmission lever to said diaphragm operating member, a fixed cam in said housing for guiding said cam follower upon actuation of said setting ring to obtain the desired adjusting characteristics for the diaphragm; spring means biasing said lever in camming relationship with said cam, a light intensity measuring means operatively associated with said setting ring for effecting automatic adjustment of the setting ring, a selector means for selectively operating said setting ring for either manual or automatic operation, said selector means including a ring member circumscribing said setting ring and said diaphragm operating ring, actuatable means controlled by said selector means for rendering inoperative the light intensity means when said selector means is set in manual position, and means responsive to the movement of said selector means for effecting adjustment of said diaphragm operating ring for manual operation.

8. The invention as defined in claim 7 wherein said selector ring includes a cam sector for simultaneously actuating both said actuatable means and said means for effecting adjustment of the diaphragm operating ring in the manual setting of said selector ring.

9. The invention as defined in claim 8 wherein said actuatable means includes a bell crank lever pivotally mounted to the shutter housing, said lever having a pair of leg portions; one of said leg portions being connected by a pin and slot connection to the diaphragm setting ring, and said other leg portion being provided with a cam follower in camming engagement with the cam sector of said selector ring.

10. The invention as defined in claim 8 wherein said means for effecting adjustment of the diaphragm operating ring in the manual position of said selector ring includes a lever pivoted to said shutter housing, said lever having a leg portion connected by a pin and slot connection to the diaphragm operating ring, and said lever having another leg portion provided with a cam follower disposed in camming engagement with the cam sector of said selector ring varies the movement of said diaphragm operating ring accordingly.

11. In a photographic camera of the type having an adjustable diaphragm in the lens assembly, in combination; a diaphragm setting member and a diaphragm operating member mounted within said housing; said members being concentrically disposed rings mounted for relative movement with respect to each other; a transmission means interconnecting said rings whereby a large movement of said diaphragm setting rings effects a relatively small movement of said diaphragm operating ring, said transmission means including a transmission lever having a cam follower, said lever being pivotally connected at one end to said setting ring, and a pin and slot connecting the other end of said transmission lever to said diaphragm operating member; a fixed cam for guiding said cam follower upon actuation of said setting ring to obtain the desired adjusting characteristics for the diaphragm and spring means biasing said lever in camming relationship with said cam.

12. In a photographic camera of the type having an adjustable diaphragm in a lens assembly wherein the diaphragm can be selectively actuated either manally or automatically in response to light intensity comprising in combination a diaphragm setting member, a light intensity measuring device cooperatively associated with said diaphragm setting member, a diaphragm operating member, a series of diaphragm lamellae pivotally connected to said diaphragm operating member, a lever pivotally mounted on and carried by said diaphragm setting member, one end of said lever acting on said diaphragm operating member for effecting the positioning of the diaphragm lamellae pivotally mounted thereto, a fixed cam, and said lever having its other end bearing against said cam to influence the adjusting characteristics of the diaphragm during automatic operation of the diaphragm.

13. The invention as defined in claim 12 and including a manually operated selector means settable at either "automatic" or "manual" positions operating on said diaphragm setting member by which the later can be switched from either manual or automatic settings, a diaphragm scale, and a cooperating setting mark operatively associated with said scale.

14. In a photographic camera of the type having an adjustable diaphragm in a lens assembly which can be either manually set or automatically set in response to a light intensity device comprising a diaphragm setting member, a light intensity device operatively associated therewith, a diaphragm operating member, a plurality of diaphragm lamellae pivotally mounted on said diaphragm operating member, a selector means, means including a fixed cam, and a lever cooperating with said fixed cam, said lever having one end pivotally mounted on the diaphragm setting member and having its other end bearing against said fixed cam, said lever and cam being rendered operative to effect automatic adjustment of the lamellae when said selector means is set for automatic operation, and means cooperatively associated with said selector means and rendering said cam and lever inoperative in the manual setting position of said selector means.

References Cited in the file of this patent

UNITED STATES PATENTS

| | | |
|---|---|---|
| 2,341,387 | Riddell | Feb. 8, 1944 |
| 2,841,064 | Bagby et al. | July 1, 1958 |
| 2,923,216 | Greger | Feb. 2, 1960 |
| 2,949,835 | Gebele | Aug. 23, 1960 |